MICROSCOPIC OIL-CONTAINING CAPSULES OF GELLED HYDROPHILIC COLLOID MATERIAL

MAGNIFICATION 800 X

GELATIN CAPSULES CONTAINING TRICHLORODIPHENYL DROPLETS, THE CAPSULES BEING SPARSELY DISPERSED IN WATER TO SHOW INDIVIDUALLY

INVENTOR
BARRETT K. GREEN
BY Pearl Berndt
Justin S. Lawston
HIS ATTORNEYS

INVENTOR
BARRETT K. GREEN
BY Pearl Berist
Justin S. Lewton
HIS ATTORNEYS

INVENTOR
BARRETT K. GREEN
BY Earl Berntt
Justus S. Lampton
HIS ATTORNEYS

INVENTOR
BARRETT K. GREEN

BY Earl Berndt
Justus S. Lawton
HIS ATTORNEYS

United States Patent Office

Re. 24,899
Reissued Nov. 29, 1960

24,899

OIL-CONTAINING MICROSCOPIC CAPSULES AND METHOD OF MAKING THEM

Barrett K. Green, Dayton, Ohio, assignor to The National Cash Register Company, Dayton, Ohio, a corporation of Maryland Original No. 2,800,458, dated July 23, 1957, Ser. No. 365,106, June 30, 1953. Application for reissue July 22, 1958, Ser. No. 755,835

18 Claims. (Cl. 252—316)

Matter enclosed in heavy brackets [ ] appears in the original patent but forms no part of this reissue specification; matter printed in italics indicates the additions made by reissue.

This invention relates to oil-containing microscopic capsules of a gelled hydrophilic coloid material and to a method of making them by salt-coacervation.

The microscopic oil-impermeable capsules, made in an aqueous medium, are several microns in diameter, and each contains, as a central nucleus, oil surrounded by a relatively and uniformly thick encapsulating wall of the gelled colloid material. If the capsules are dispersed in a great deal of water they may exist individually, but if the free water is removed the capsules tend to agglomerate like bunches of grapes until the mass becomes adherent and more or less solid.

By the process steps to be described, the colloid encapsulating material is rendered impermeable, as far as the oil is concerned, so that it cannot escape until the capsule is ruptured. In this way the oil is contained protected against environmental and other deleterious influences. In the event the free water is removed, the capsules may be treated as solid material even though more than 50% of the weight of the mass may be oil in liquid form. If desired, the capsules may be hardened and rendered insoluble so that the free water may be driven off by heat, the dried material being immune to the destructive influence of water and other equivalent solvents.

The oils which may be used in the process are the water-immiscible oils which are inert as to the encapsulating material and which may be emulsified with an aqueous sol of the particular hydrophilic gellable colloid used. Among such oils are the mineral oils such as petroleum fractions; animal oils such as sperm oil; fish oils such as halibut liver oil; vegetable oils such as cotton seed oil, corn oil, castor oil, and coconut oil; essential oils from plants, and synthetic oils such as methyl salicylate and chlorinated diphenyl.

Among the gellable hydrophilic colloid materials may be mentioned gelatin and agar-agar.

In the oil, that is used to form the droplets which are surrounded by the encapsulating material, may be dissolved various selected materials, or dispersed solid material of colloidal size, such added substances, of course, being inert to the other ingredient materials. Among such finely divided solid substances may be mentioned dyes such as are used in making inks, solid chemical reactant substances which will be described, medicines, perfumes, and other materials which it is desired to have protected from the environment or which it is desired to have isolated for other reasons. Among substances which may be dissolved in the oil may be mentioned oil-soluble dyes, adhesives, oil-soluble vitamins, and the like.

Among the most important uses for such material in an aqueous dispersion is as a paper coating composition which forms a transfer film. The oil in the microscopic capsules so used would be of itself or contain a marking material which would be transferred to an underlying sheet by printing or marking pressures that rupture the capsules of the overlying transfer film, to cause said marks on the underlying sheet. Transfer films of rupturable type which contain oily droplets of marking fluid are disclosed in United States Patent No. 2,548,366, which issued on the applicaiton of Barrett K. Green, this applicant, and Robert W. Sandberg, but such disclosed films are not composed of capsules. Transfer films such as disclosed in said patent consist of a continuous film phase of gelled hydrophilic colloid material having fluid droplets of oil dispersed therethrough. The aforesaid continuous film affords some opportunity for escape of the fluid droplets because of the sponge-like texture of the colloid gel film surrounding the voids which hold the oil. Cracks in the films of the type disclosed in said patent will run right across the voids which hold the oil, releasing the oil. Such cracks may be caused by folding or rough handling of the material, or may be caused by unusual environmental conditions.

The product of this invention makes transfer films superior to those disclosed in said patent, in that cracks in the film formed by the capsular material of this invention do not run across the capsules, but around them, so that the oil is not released by random cracks produced in the film. Moreover, the pore size of the hydrophilic colloid encapsulating film may be reduced during gelation and drying to render the encapsulating film impermeable to the oil inside, as will be explained.

Bacause all films of gelled hydrophilic colloid material are to a degree molecularly porous because of the nature of gel structures, the capsules will be more or less porous according to the control exercised in forming them. If the gelation step is performed rapidly the pore size will be small and the capsules will retain, by sieve action, oils having relatively small molecules. If the gelation step is performed slowly the pore structure of the encapsulating material will be coarser. The hardening step is carried out in a high pH environment, as will be described, which makes the capsules harder, more heat resistant, and insoluble in water. If the capsules are used to hold marking fluids, small pores are desired, whereas if the capsules are to be used for other purposes where slow release of the oil from the capsules is desired, larger pores would be preferred. The process is flexible to achieve either condition.

If the capsules are to be dried, they may be dried in an oven and the resulting agglomerate material ground and washed to remove the oil which escaped during grinding, to form apparently dry granules or, if desired, the fluid-dispersed capsules may be spray dried, in which event no comminution or washing is necessary. In the dry granular form the capsules containing the fluid oil are handled and stored in the same manner as other dry materials are handled and stored.

Therefore, it is an object of this invention to provide microscopic capsules of a gelled hydrophilic colloid material each having a central oil nucleus.

It is another object of the invention to provide such capsules dispersed in a fluid.

It is an alternative object to provide such capsules in outwardly dry form.

It is further an object of the invention to provide microscopic oil-containing capsules of hydrophilic gelled colloid material in which the pore size of the encapsulating material was controlled by the conditions of its manufacture.

Another further object of the invention is to provide such oil-containing capsules in which the encapsulating material has been hardened.

With further objects in view which will become apparent in the specification to follow, the invention includes the use of novel ingredients and processing steps, some of which are optional, described with reference to the drawings which accompany and form part of this specification.

Figure 1:
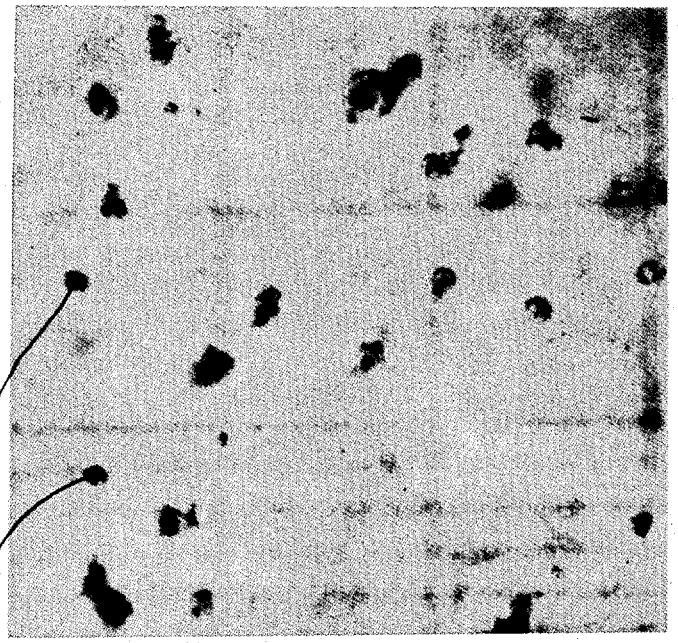
Fig. 1 is a reproduction of a micro-photograph of the capsules dispersed in a great amount of water, the magnification being about 800 diameters.
Figure 2:
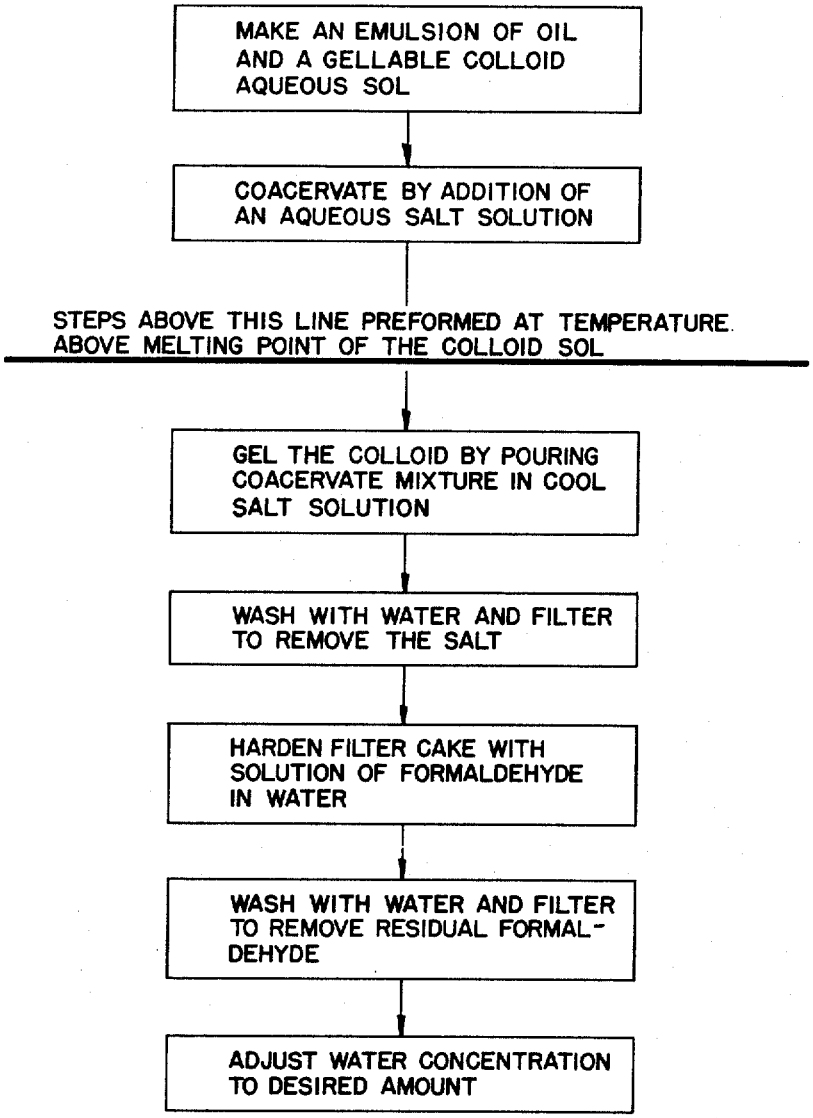
Fig. 2 is a block diagram showing the steps followed in making the gelled and hardened colloid capsules, this figure showing the process in general without the specific recitation of ingredients and amounts of ingredients.
Figure 3:
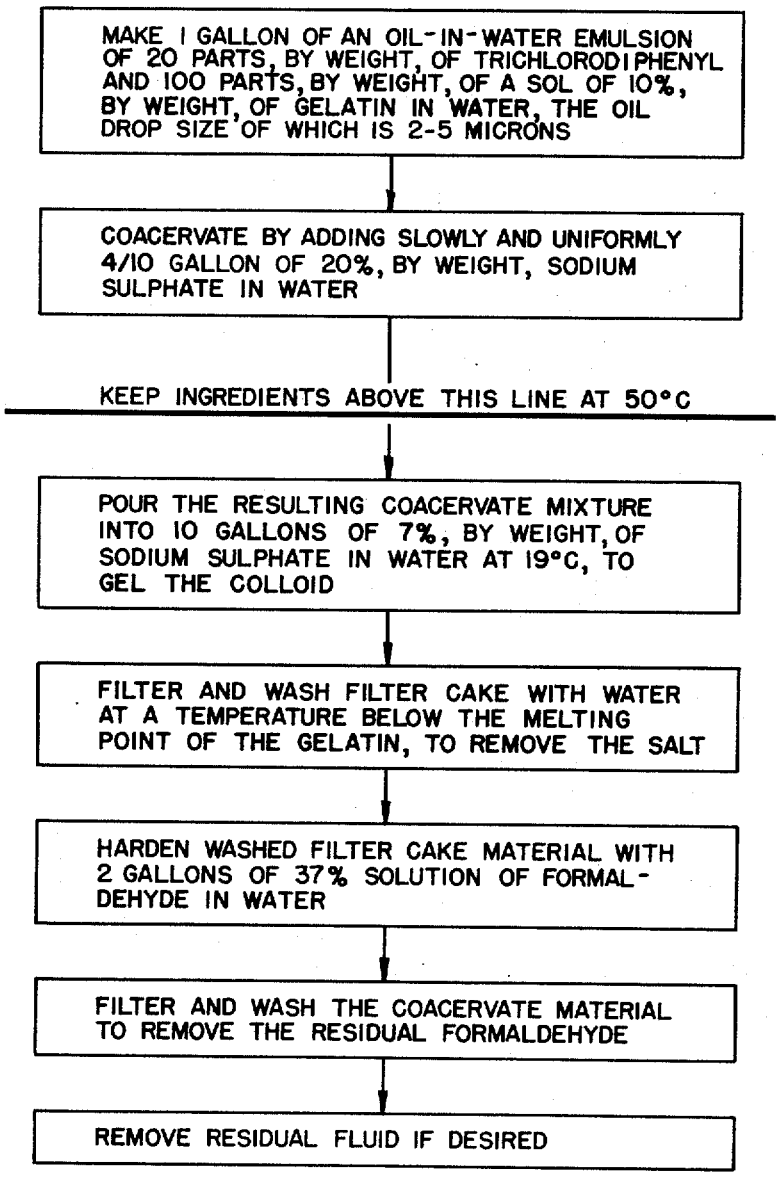
Fig. 3 shows the method in more specific form, with gelatin and trichlorodiphenyl as the ingredients, and with sodium sulphate as the salt.
Figure 4:
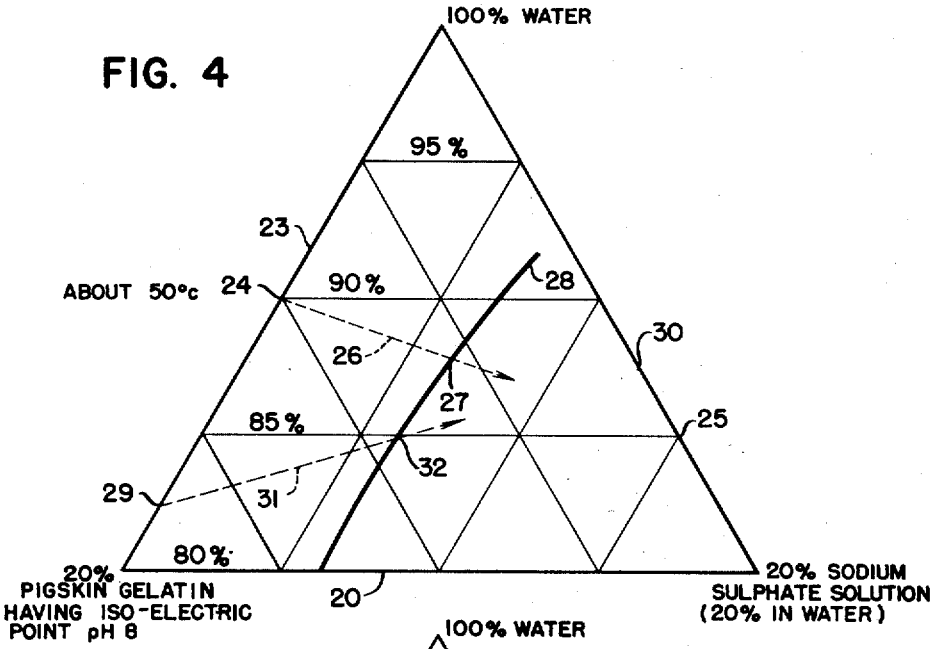
Fig. 4 is a tertiary diagram showing the coacervation region of a sol of gelatin in water, using sodium sulphate as the salt.

Referring to Fig. 2, the process, in general, includes the first step of forming an emulsion of oil and a gellable colloid aqueous sol. This is made by dispersing the colloid in water, adding the oil and forming an emulsion by stirring. Next, after having determined the coacervate region of the sol, by making a diagram as shown in Figs. 3 and 4, as will be described, a coacervate is formed by the addition of a proper amount of an aqueous solution of a suitable coacervating salt. In order that the colloid will not gel prematurely the foregoing steps are performed at a temperature above the melting point of the colloid sol. Thereafter, the colloid is gelled by pouring the coacervate mixture into a cool solution of the same salt which was used for the coacervation, causing the colloid deposited around the individual oil droplets to gel. This gelled colloid capsular mass is washed with water and filtered to remove the salt. If it is desired to harden and make the capsular material hard and insoluble, the filter cake is treated with a solution of formaldehyde. According to what use is to be made of the finished material, the free water is adjusted to the desired concentration, or the free water is removed entirely.

The preferred form of the invention, shown step by step in Fig. 3, utilizes gelatin, preferably high quality pigskin gelatin which has its iso-electric point at pH8. Inasmuch as the finished encapsulated material will find an important use in the making of coating compositions which will form a transfer film on record material, such as paper, the preferred oil used is trichlorodiphenyl which is relatively non-volatile, inert, and which can be obtained in a colorless and pure form. Into this trichlorodiphenyl may be dissolved a colorless color-reactant such as the crystal violet lactone which is, as specified in the patent to which reference has been made, 3,3 bis(p-dimethylaminophenyl) 6-dimethylamino phthalide. The described phthalide compound has a white crystalline structure and, when dissolved to the extent of about 3%, by weight, in the trichlorodiphenyl and placed in contact with a sheet of paper sensitized with attapulgite, will turn to a dark blue color similar to crystal violet. When fluid-dispersed capsular material containing this oil is applied to a sheet and dried to form a transfer film, the capsules may be ruptured locally at points of printing and marking pressures to release the oil which will thereupon come in contact with the sensitized undersheet, as mentioned in said patent. In making up the preferred material, one gallon of an oil-in-water emulsion of 20 parts, by weight, of trichlorodiphenyl containing the phthalide and 100 parts, by weight, of a sol of 10%, by weight, of pigskin gelatin in water, is prepared, the emulsifying continuing until the drop size of the oil is from 2 to 5 microns. This material is kept at 50° centigrade to prevent the gelatin from gelling. With the temperature of the ingredient still kept at 50°, the coacervation then is induced by adding, slowly and uniformly, four-tenths of a gallon of 20%, by weight, of sodium sulphate in water. During coacervation, the gelatin molecules are deposited uniformly about each oil droplet as a nucleus. The uniform addition of this material is accomplished by continuous agitation.

To gel the coacervate, the heated coacervate mixture is poured into 10 gallons of 7%, by weight, of sodium sulphate in water at 19° centigrade, with agitation. At this point the encapsulation of the oil with gelled hydrophilic material has taken place and the further steps are to put it in condition for use as is intended. The material is filtered and washed with water, the temperature being kept below the melting point of the gelatin, to remove the salt. If desired, the filtered material is hardened by combining it with 2 gallons of a 37% solution of formaldehyde in water. This hardened mass then is filtered and washed to remove the residual formaldehyde. The resulting filter cake is adjusted to the proper water content by the addition of water or the removal thereof, by ordinary means such as centrifuging or spray drying, and the material is ready for use. If this material is intended for paper coating composition it is kept in aqueous suspension and applied directly to the paper which is then dried leaving the capsules adherent to the paper and to each other in a film.

Figure 5:
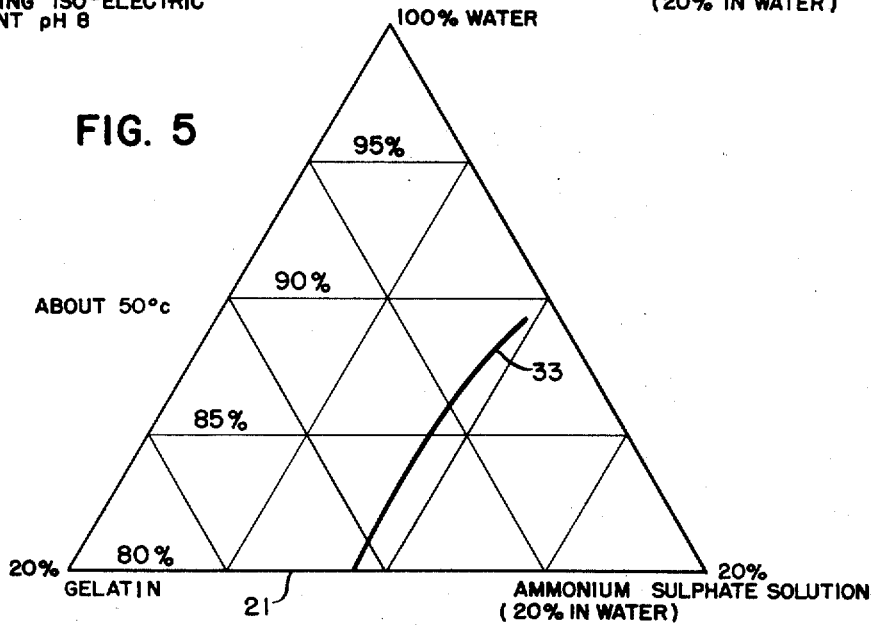
Fig. 5 is a ternary diagram showing the coacervation region of a sol of gelatin in water, using ammonium sulphate as the salt.

In determining under what conditions with particular materials coacervation takes place, resort may be had to the formation of a ternary diagram resulting from a testing of various amounts of pigskin gelatin and sodium sulphate solution, whereas Fig. 5 shows the results of testing various amounts of the same gelatin with an ammonium sulphate solution. In the causation of coacervation by use of a salt, the salt attracts water away from the colloid material causing the colloid material to separate or unmix, forming, in the vessel in which this step is taken, after they are allowed to separate by gravity, a colloid-rich fluid in the bottom and a layer extremely poor in colloid material on top. The tests which are made to determine the coacervate region as far as amounts of material are concerned can be done with the colloid sol and the salt solution without the oil. Inasmuch as it is impractical to work with solutions of gelatin in which there is less than 80% water, because of viscosity, the diagrams of Figs. 4 and 5 deal in that portion of the tenary scale above 80% water. The line 20 in Fig. 4 and the line 21 in Fig. 5 represent 80% water, the horizontal lines being indexed with the intermediate percentages of water. Coacervation is noticed by a clouding effect appearing in the sol which transmits less light than normal. This may be noted by passing a beam of light through the sol as the salt solution is added and estimating by eye the change towards a cloudiness, or an electric photometer may be used. A particular sol is made of the pigskin gelatin and various solutions of sodium sulphate in water are added thereto. Referring to Fig. 4, with a starting point of any place on line 23, that is to say any sol of gelatin and water having less than 20% gelatin content, by weight, the aqueous sodium sulphate solution is added. For instance, if a 10% gelatin in water sol is used, the starting point would be 24 (Fig. 4) on line 23. If now a 15% solution of sodium sulphate in water, as would be plotted at point 25, is added slowly which would be plotted along the dotted line 26, at point 27 a clouding effect will be noticed which means that the gelatin in water sol is changing so that the entire mass of gelatin in a liquid phase is contracted because of the increased interaction between the gelatin molecules. This clouding effect, first noticed at point 27, will continue as more of the sodium sulphate solution is added. During the experiments to determine the coacervate line 28 by various experiments with different concentrations of sol and salt solution, the ingredients are kept at about 50° centigrade. As another example in determining the line 28 of Fig. 4, a 17½% sol of gelatin in water, represented by point 29, is treated with a 12½% solution of sodium sulphate in water as represented by point 30. As this sodium sulphate solution is added to the aqueous gelatin sol, the addition takes the mixture along the line 31 toward point 30, the clouding effect of coacervation becoming apparent at point 32. By making a number of such experimental additions of the sodium sulphate solution to various sol concentrations, the contour of line 28 may be ascertained and the ranges within which coacervation occurs by the addition of sodium sulphate solution to the gelatin sol may be ascertained. The region to the right of line 28 is the coacervate region of the mixture but the addition of salt solution should not be carried far past the line 28 in actual practice, the more salt solution added the more aggregation occurring until a lumpy mass is formed. In a similar manner the line 33 of Fig. 5 may be determined by the use of ammonium sulphate solution.

It will be evident that the ammonium sulphate solution is not as efficient in action as the sodium sulphate solution and the same differences occur with other salts. Useful salts for coacervation may be made from the cations $$Na > K > Rb > Cs > NH_4 > Li$$

and the anions $$SO_4 > \text{citrate} > \text{tartrate} > \text{acetate} > Cl$$

such being arranged in the order of their effectiveness in this process.

When oil droplets are present the gelatin still in the liquid phase starts to draw together entrapping the oil droplets by deposition of the sol material around them individually as nuclei, forming a strong shell-like wall, and upon gelation of the colloid material the capsules are complete.

Reference has been made to the fact that the size of the pores in the encapsulated material may be controlled during the gelling process. The faster the gelation of the colloid the finer the pore size of the gelled structure will be, and vice versa. As was said with reference to Fig. 3, the gelation of the gelatin was accomplished by pouring the coacervated mixture, amounting to about a gallon and a half, into 10 gallons of relatively cool water—19° centigrade. This causes rapid cooling and rapid gelation of the gelatin, resulting in a pore size so small that the encapsulated trichlorodiphenyl cannot escape through the capsule walls. Less rapid cooling will result in pores of larger size and the oil used may gradually escape or not as is determined by the size of the pores in the encapsulating film and the size of the oil molecules. That capsules made in accordance with the process of Fig. 3 actually retain the trichlorodiphenyl oil has been proved in various ways. Some of the dried capsular material was placed in a Soxhlet extractor with toluene and subjected to extraction for a week. The material was then removed and dried. Upon crushing the capsular material, oil was released. In another instance paper which had been coated with a film of the capsular material containing 3,3 bis(p-dimethylaminophenyl) 6-dimethylamino phthalide in the oil droplets was similarly treated in the Soxhlet extractor. Upon removal and drying, it was used as a transfer sheet by placing it over a paper coated with attapulgite clay. It made marks on the clay-coated sheet when subjected to printing and writing pressures, that were as good as those made with an amount of unprotected oil equal to that in the paper. Whereas the unprotected oil evaporated in one day, there was no evidence of any loss of oil from the paper, even though left in the oven for over 90 days at the same temperature.

While the invention, including the ingredients and steps, has been fully outlined in the foregoing specification, the steps are capable of some modification in regard to temperature and amounts of ingredients used, and the ingredients themselves, of course, may be changed, as indicated earlier in the specification.

What is claimed is:

1. The method of making oil-containing microscopic capsules of gellable hydrophilic colloid material, including the steps of making an aqueous sol of a gellable hydrophilic colloid material; emulsifying therein an oil; adding and stirring into the emulsion a previously determined aqueous coacervate salt soluiton, of such concentration and in such amount as to bring the emulsion into the coacervate region defined by the occurrence of a clouding effect when the aqueous salt solution is added to the colloid solution in the absence of oil, all of the foregoing steps being carried out at a temperature above the gelation point of the colloid material, whereby the colloid material deposits around each oil droplet by coacervate forces, encapsulating each of them; and gelling the colloid material by cooling.

2. The method of claim 1 in which the colloid used is gelatin.

3. The method of claim 1 in which the salt is sodium sulphate.

4. The method of claim 1 in which the colloid material is gelatin and the salt is sodium sulphate.

5. The method of claim 1 in which the salt is ammonium sulphate.

6. The method of claim 1 in which the colloid material is gelatin and the salt ammonium sulphate.

7. The method of claim 1 in which the steps before gelation are carried out above the gelation point of the colloid and the pore size of the capsular material around the oil droplets is made small by the rapid cooling of the coacervate material to cause rapid gelation of the colloid.

8. Oil-containing microscopic capsules made according to the method of claim 1.

9. Oil-containing microscopic capsules made according to the method of claim 2.

10. Oil-containing microscopic capsules made according to the method of claim 3.

11. Oil-containing microscopic capsules made according to the method of claim 4.

12. Oil-containing microscopic capsules made according to the method of claim 5.

13. Oil-containing microscopic capsules made according to the method of claim 6.

14. Oil-containing microscopic capsules made according to the method of claim 7.

*15. The method of making oil-containing microscopic capsules of gellable hydrophilic colloid material, including the steps of forming an emulsion of oil and an aqueous sol of gellable hydrophilic colloid material, then changing the condition of the resultant oil-containing sol to increase interaction between colloid molecules of said sol and bring said sol into the coacervate region wherein said colloid material contracts as a colloid-rich coacervate, the said region being defined by the occurrence of a clouding effect when the condition of the same colloid sol is changed in the same way in the absence of oil, all of the foregoing steps being carried out at a temperature above the gelation point of the colloid material, whereby coacervate colloid material deposits around each oil droplet encapsulating each of them, and gelling the encapsulating colloid material by cooling.*

*16. Oil-containing microscopic capsules made according to the method of claim 15.*

*17. The method of claim 15, in which said cooling is with agitation.*

*18. Oil-containing microscopic capsules made according to the method of claim 17.*

References Cited in the file of this patent or the original patent

UNITED STATES PATENTS

| | | |
|---|---|---|
| 2,183,053 | Taylor | Dec. 12, 1939 |
| 2,410,110 | Taylor | Oct. 26, 1946 |
| 2,711,375 | Sandberg | June 21, 1955 |

| | | |
|---|---|---|
| 2,730,457 | Green et al. | Jan. 10, 1956 |
| 2,800,457 | Green et al. | July 23, 1957 |

FOREIGN PATENTS

| | | |
|---|---|---|
| 514,047 | Great Britain | Oct. 30, 1939 |
| 454,386 | Germany | Jan. 6, 1928 |

OTHER REFERENCES

Emulsion Technology (1946,) pages 26, 68, 69.